United States Patent [19]
Komara

[11] Patent Number: 5,490,172
[45] Date of Patent: Feb. 6, 1996

[54] REDUCING PEAK-TO-AVERAGE VARIANCE OF A COMPOSITE TRANSMITTED SIGNAL VIA OUT-OF-BAND ARTIFACT SIGNALING

[75] Inventor: Michael A. Komara, Indialantic, Fla.

[73] Assignee: AirNet Communications Corporation, Melbourne, Fla.

[21] Appl. No.: 270,246

[22] Filed: Jul. 5, 1994

[51] Int. Cl.$^6$ ............................ H04K 1/02; H04L 25/03; H04L 25/49

[52] U.S. Cl. .............................................. 375/296; 455/63

[58] Field of Search ...................................... 375/295, 296, 375/297, 284, 285, 260; 370/70, 69.1, 123; 455/50.1, 63

[56] References Cited

U.S. PATENT DOCUMENTS

| | | | |
|---|---|---|---|
| 4,316,282 | 2/1982 | Macina | 370/70 |
| 4,785,447 | 11/1988 | Ichiyoshi | 370/70 |
| 4,881,191 | 11/1989 | Morton | 364/724.1 |
| 5,170,413 | 12/1992 | Hess et al. | 375/260 |
| 5,289,464 | 2/1994 | Wang | 375/260 |
| 5,323,391 | 6/1994 | Harrison | 370/70 |

FOREIGN PATENT DOCUMENTS 9410772  5/1994  WIPO .

OTHER PUBLICATIONS

Bonnerot, et al., "Digital Processing Techniques in the 60 Channel Transmultiplexer", IEEE Transactions on Communications vol. COM–26, May 1978, pp. 698–706.

Bellanger, et al., "TDM–FDM Transmultiplexer: Digitial Polyphase and FFT", IEEE Transactions on Communications, vol. COM–22, Sep. 1974, pp. 1199–1205.

Bakhru, "Multi–Channel Digital Sonobouy Receiver", in MILCOM 90: IEEE Military Communications Conference Record, (New York: Institute of Electrical and Electronic Engineers, 1990), vol. 3, pp. 1250–1255.

Chester, et al., "Implementation of a Wide Band, High Dynamic Range Digital Drop Receiver", IEEE Proceedings of ICASSP 91, May 14–17, 1991.

Olmstead et al., "A Digital Tuner for Wideband Receivers", DSP Applications Magazine, Sep., 1992.

*Primary Examiner*—Stephen Chin
*Assistant Examiner*—Hai H. Phan
*Attorney, Agent, or Firm*—David J. Thibodeau, Jr.

[57] ABSTRACT

A technique which enables the use of a low cost non-linear power amplifier to generate a wideband composite signal, such as in cellular mobile telephones (CMTs), personal communication systems (PCSs), and other multi-channel wireless system. A constant envelope signal is generated from a wideband composite signal comprised of a combination of many narrowband modulated signals. The technique involves adding one or more out-of-band artifact signals that accurately offset the amplitude variations of the wideband composite signal. The constant envelope signal is then fed to a high power amplifier, and, prior to radio transmission the amplified signal is filtered to remove the out-of-band artifact signals. As a result, only the desired composite signal having any required envelope variations is provided to the antenna, while at the same time, only a constant envelope signal is fed through the power amplifier.

7 Claims, 4 Drawing Sheets

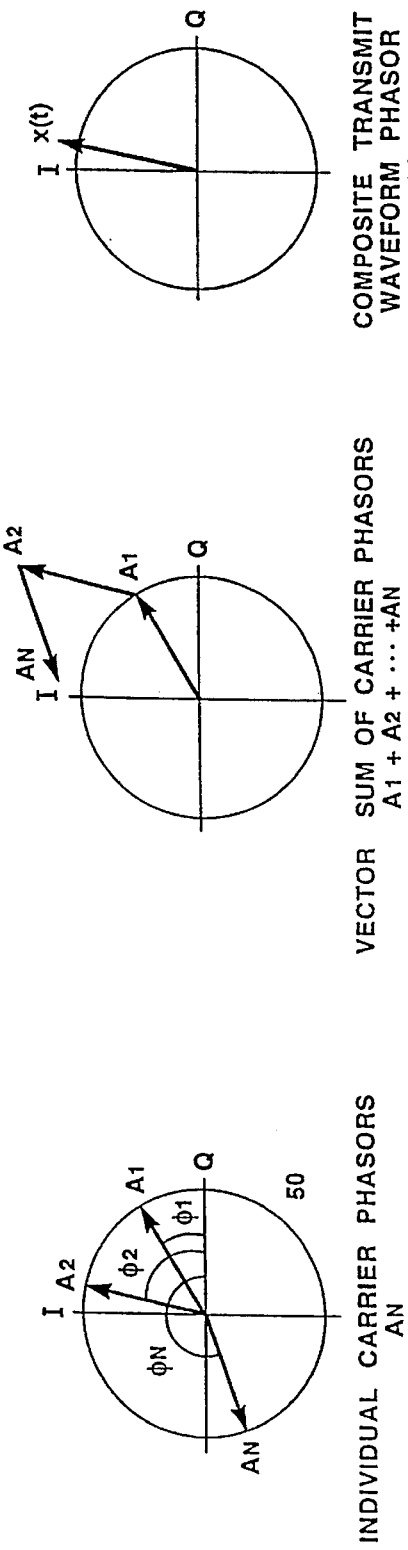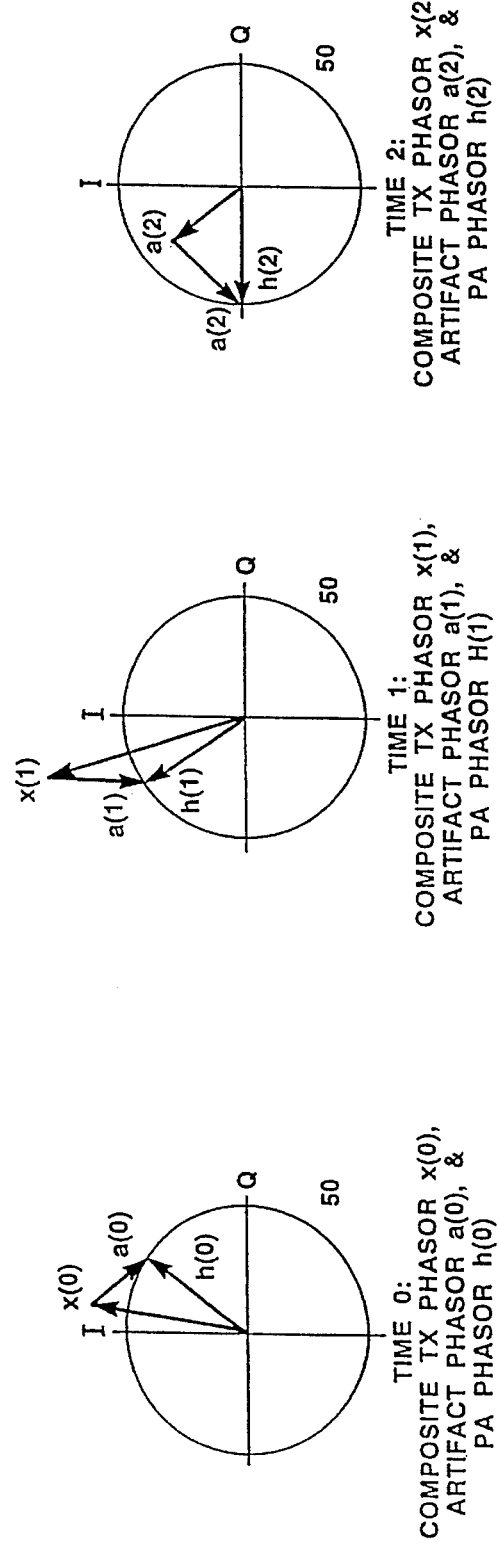

5,490,172

1

REDUCING PEAK-TO-AVERAGE VARIANCE OF A COMPOSITE TRANSMITTED SIGNAL VIA OUT-OF-BAND ARTIFACT SIGNALING

FIELD OF THE INVENTION

This invention relates generally to multichannel wireless communication systems, and in particular to a multichannel transmitter which offsets variations in the envelope of a composite transmitted signal by adding out-of-band artificer signals.

BACKGROUND

The providers of certain multiple-access communications systems, such as wireless cellular mobile telephone (CMT) and personal communication systems (PCS), prefer to employ base station transmitter and receiver equipment that is as flexible as possible in terms of the channel coverage provided by a particular transceiver site. This is true for CMT systems deployed in rural areas, where signal traffic may be concentrated along a roadway, as well as for systems deployed in densely populated areas, where a fixed-in-advanced channel capacity may be inadequate.

Such characteristics are also desirable whenever relatively large, secure, and protective structures are not necessarily available or cost effective. For example, in certain PCS systems as now being proposed, a large number of small coverage areas, or cells, will be necessary. In these PCS system, wireless base station equipment may be deployed in cells as small as 500 feet in diameter.

One way to resolve these difficulties is to implement a base station transceiver using high speed analog-to-digital (A/D) and digital-to-analog (D/A) converters, together with efficient digital filtering algorithms such as the Fast Fourier Transform (FFT). In the receiver section, a forward FFT-based filter bank analyzer, or so-called channelizer, separates the incoming signal energy into multiple ones of the desired channels. On the transmit side, an inverse FFT-based filter bank synthesizer, or so-called combiner, outputs a composite frequency-modulated signal representative of the contents of the combined channel signals. In this manner, relatively compact, lightweight, inexpensive, and reliable digital integrated circuits may be used to cover the entire channel capacity offered by the communication service provider.

For a more detailed description of such a system, please refer to a copending U.S. patent application of Carney, R., and Williams, T., entitled "Transceiver Apparatus Employing Wideband FFT Channelizer with Output Sample Timing Adjustment and Inverse FFT Combiner for a Multichannel Communication Network" filed Apr. 8, 1994 and given Ser. No. 08/224,754.

Unlike prior art base stations, such a wideband digital base station is capable of receiving or transmitting on any number of channels at any instant in time. While this provides maximum flexibility and a certain number of other advantages in designing a multichannel wireless communication system, it also poses a number of unique problems.

In particular, consider that the individual signals may use modulation schemes that do not exhibit a constant amplitude envelope, such as amplitude modulation (AM), or quadrature amplitude modulation (QAM). Even when constant envelope modulation schemes, such as frequency modulation (FM), frequency shift keying (FSK), or phase shift keying (PSK) are used on the individual channel signals, the

2 composite waveform generated by the combiner cannot be guaranteed to exhibit a constant envelope. This is because the composite signal generated is a sum of digital channel signals having non-deterministic phases, and because the channel signals may be activated independently of each other. The composite signal thus does not exhibit a constant amplitude envelope over time, regardless of the modulation used. Rather, at best, the composite signal can be predicted to have a uniformly random phase distribution and a Rayleigh probability density amplitude envelope.

The resulting Rayleigh-distributed envelope has undesirable high peak-to-average power requirements that place demanding linearity and dynamic range requirements on the transmit signal path. These requirements are especially acute for the high-power amplifier component which must typically be placed between the up converter which follows the combiner and the antenna. Because of this phenomenon, for example, a 50 Watt transmit amplifier may actually be required to handle 250 Watt signals for short periods of time. That is, the instantaneous peak power output must typically be about five (5) times the average power output, and the power amplifier design must achieve this with minimal distortion to the individual channel signals and without creation of in-band or out-of-band spurious tones.

While it is possible to design a power amplifier which has sufficient linearity to achieve this result, the amplifier is decidedly more complex in design, less efficient, and more expensive than would otherwise be required.

It would be preferable if the signal to be transmitted had an amplitude envelope with as constant a probability, density as possible. This would then permit a lower cost, non-linear power amplifier to be used. Indeed, if it were possible to allow for absolutely no variations in transmit power, that is, if an exactly constant envelope signal could be provided, then the power amplifier could be designed to run in a saturation region, and simply hard-limit the transmit waveform.

In addition, there should not be any undesirable residue frequencies, or spurious tones, created which would otherwise not be removed prior to signal transmission. Although unused in-band frequencies might be permitted to contain residual signal artifacts by design, it is unlikely that regulatory agencies would approve of the use of such techniques.

SUMMARY OF THE INVENTION

Briefly, the invention is a technique to generate a constant envelope signal from a wideband composite signal comprised of a combination of many narrowband modulated signals. The technique involves adding one or more out-of-band artifact signals that accurately offset the amplitude variations of the wideband composite signal, thereby generating a constant envelope signal. The added artifact signals are such that there is little degradation in the quality of the spectral purity of the desired in-band frequencies. The constant envelope signal is then fed to a high power amplifier prior to radio transmission. Before transmission, this amplified signal is filtered to remove the out-of-band artifact signals, so that only the composite signals are provided to the antenna.

More particularly, to generate the set of artifact signals, the invention operates on the complex-valued composite signal output by a wideband digital combiner. One or more artifact signals of the necessary amplitude, phase, and out-of-band frequency are then added to the composite signal, resulting in a signal having a constant envelope characteristic.

To generate these artifact signals from the samples of a complex-valued digital composite signal, an in-phase and quadrature (I and Q) coordinate transform or similar device first determines the instantaneous phase and amplitude of the samples of the composite signal. The phase and amplitude vectors required to impart a constant power envelope to the composite signal are then determined. These artifact vectors are then digitally added to the composite signal.

The invention has several advantages. First, the power amplifier no longer needs to exhibit extreme linearity, or excessive dynamic range characteristics, and can actually be designed to clip to some extent, since the waveform that it amplifies has a constant envelope.

Secondly, the transmit filters placed in the signal path after the power amplifier pass the desired in-band frequencies directly to the transmit antenna, while insuring the out-of-band artifact signals are passed to an impedance-matched dummy load. The residual artifacts created by the envelope-shaping technique thus pass through the power amplifier, but are not passed through the antenna. The signal passing through the power amplifier thus has a constant envelope characteristic, although the signal actually transmitted does not.

BRIEF DESCRIPTION OF THE DRAWINGS

For a fuller understanding of the advantages provided by the invention, reference should be had to the following detailed description together with the accompanying drawings, in which:

FIG. 2A through 2F are phasor diagrams illustrating how the artifact generator determines the amplitude and phase of one or more artifact signals;

DETAILED DESCRIPTION OF A PREFERRED EMBODIMENT

Introduction

Figure 1:
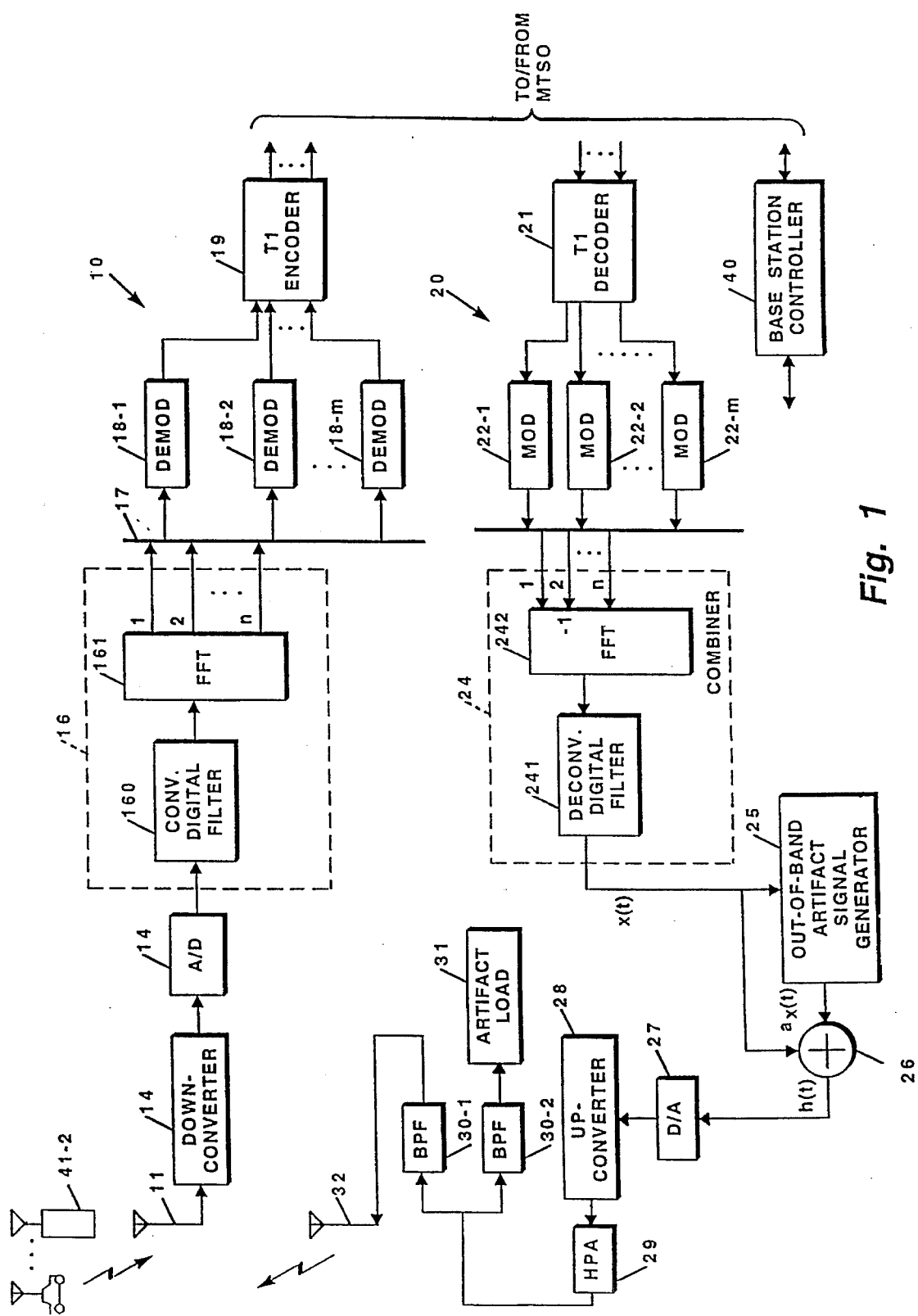
FIG. 1 is a block diagram of a wideband digital transceiver that makes use of an out-of-band artifact signal generator according to the invention.

FIG. 1 is a block diagram of a multichannel wireless digital base station according to the invention. The base station consists of a receiver section 10, a transmitter section 20, and a base station control processor (controller) 40.

The receiver 10 consists of a receive antenna 11, a frequency downconverter 12, an analog-to-digital (A/D) converter 14, digital channelizer 16, a first time division multiplex (TDM) bus 17, a plurality of digital demodulators 18-1,18-2, . . . , 18-m (collectively, demodulators 18), and a transport signal encoder 19.

The transmitter 20 includes a transport signal decoder 21, a plurality of digital modulators 22-1, 22-2, . . . ,22-m, (collectively, modulators 22), a second TDM bus 23, a combiner 24, an out-of-band artifact signal generator 25, an adder 26, a digital-to-analog (D/A) converter 27, a frequency upconverter 28, a power amplifier 28, a pair of trans-diplexed band-pass filters 30-1 and 30-2, and a transmit antenna 32.

In operation, the base station exchanges radio frequency (RF) signals with a number of mobile or portable subscriber terminals (mobiles) 41-1, 41-2 (collectively, mobiles 41). These RF signals typically include voice and/or data channel signals which are modulated onto one or more carrier signals. The base station couples these channel signals to the public switched telephone network (PSTN), such as via a Mobile Telephone Switching Office (MTSO). The particular RF modulation used may be in accordance with any one of a number of different air interface standards, including frequency modulation (FM), as specified by the well known Advanced Mobile Phone Service (AMPS) standard, time division multiple access (TDMA) such as specified by the IS-54B standard, code division multiple access (CMDA) as in the IS-95 standard, or other modulations as those specified by the European Global System Mobile (GSM) standard, personal communication system (PCS) standards, or the like.

The present invention is concerned with a technique for minimizing the peak-to-average variance of a composite signal generated by the transmitter high power amplifier (HPA) 29. However, a brief description of the receiver 10 will assist in understanding the invention.

The Wideband Receiver

In operation, RF signals frown the mobiles 41 are received at the receive antenna 11, and forwarded to the wideband downconverter 12. The downconverter 12 translates the center frequency of the RF signals received at the antenna 11 to an intermediate frequency (IF) within the bandwidth of the A/D converter 14. The downconverter 12 may actually use several stages of mixers, amplifiers, and bandpass filters, as is well known in the art.

The downconverter 12 is wideband in the sense that it covers a substantial portion of the bandwidth available to the wireless service provider who is operating the base station. For example, if the air interface implemented by the base station is IS-54B, the downconverter 12 may process as much as a 12.5 MegaHertz (MHz) bandwidth in the 800–900 MHz range. This bandwidth contains a composite signal that may include as many as 416 active channel signals, each having an approximately 30 kilohertz (kHz) bandwidth. Usually, one-half of the channels are reserved for transmitting signals and one-half for receiving. Thus, in the IS-54B example being described, there are typically two-hundred-eight (208) channels processed by the receiver 10 and 208 channels processed by the transmitter 20.

The digital signal output by the A/D converter 14 is then forwarded to the digital channelizer 16. The digital channelizer 16 is essentially a bank of digital filters, which separate the down converted composite signal to a plurality, n, of individual digital channel signals. In the case of the IS-54B example, the digital channelizer 16 can thus be considered to be a bank of 208 digital filters, with each filter having a 30 kHz bandwidth.

The digital channelizer 16 may implement the filter bank using any of several different filtering techniques, such as described in Crochiere, R. E., and Rabiner, L. R., *Multirate Digital Signal Processing* (Englewood Cliffs, N.J.: Prentice-Hall, 1983), Chapter 7, pp. 289–400. The channelizer 16 may, for example, use a convolutional digital filter 160 followed by a Fast Fourier Transform (FFT) 161. A co-pending United States patent application entitled "Transceiver Apparatus Employing Wideband FFT Channelizer with Output Sample Timing Adjustment and Inverse FFT Combiner for a Multichannel Communication Network" filed on Apr. 8, 1994 and given Ser. No. 08/224,754 describes several particular embodiments of the digital channelizer 16 in greater detail.

Regardless of the implementation of the channelizer 16, however, it provides a number, n, of individual digital channel signals, wherein each of these n outputs represents the signal in one of the channels received from one of the mobiles 41.

The digital channel signals at the output of the channelizer 16 are then provided over the time division multiplex (TDM) bus 17 to the plurality of digital demodulators 18. The demodulators 18 are each programmed to remove the modulation on one channel signal, as specified by the air interface standard being implemented. There typically is not a one-to-one correspondence between the number, m, of demodulators 18, and the number, n, of channel signals. For example, the demodulators 18 may each be a digital signal processor (DSP) programmed to process a number, such as 24, of the channel signals at the same time.

The base station controller 40, using the TDM bus 17 and suitable read and write access control signals, manages access by the n individual digital channel outputs to the m demodulators, such as by assigning a time slot to each channel.

The outputs of the demodulators 18 representing the audio and/or data signals originated by the mobiles 41 are then forwarded to the transport encoder 19. The encoder 19 reformats the demodulated signals as telephone signals suitable for transmission to a local Mobile Telephone Switching Office (MTSO). The demodulated signals may be reformatted according to any one of a number of well-known time multiplex telephone signal transport protocols, such as the so-called T1 or E1 span. The encoded signals are then processed by the MTSO in a known fashion, to ultimately complete a connection from the mobile subscriber units 41 to a desired destination, such as another telephone subscriber who is connected to the Public Switched Telephone Network (PSTN).

To set up each connection, the base station controller 40 must exchange certain control information with the MTSO. For example, a mobile unit 41 wishing to place a call indicates this by signaling the base station on one or more control signal channels.

The base station controller 40 forwards this request for access to the MTSO. Upon receiving an indication from the MTSO that the connection can be made, the base station controller 40 then performs a number of steps, to insure that the appropriate data path through the TDM buses 17 and 23 are enabled to support communication with between the newly enabled mobile 41 and the MTSO.

The Wideband Transmitter

As mentioned above, the present invention is in the manner in which the transmitter 20 generates out-of-band artifact signals to offset variations in the envelope of a composite signal. Turning attention now to the transmitter 20 in more detail, digitized voice and/or data signals received from a signal source, such as the MTSO, are provided to the transport decoder 21, which removes the transport signal formatting to provide a plurality of channel signals.

The channel signals are then coupled to a number of digital modulators 22-1, 22-2, . . . , 22-m (collectively, modulators 22) that modulate the channel signals according to the desired interface standard. Ultimately, these modulated signals are then each coupled to one of the n inputs of the combiner 24. As was true in the receiver 10, the TDM bus 23 permits any one of the modulators 22 to be connected to any one of the n signal inputs of the combiner 24.

Although each modulator 22 typically processes multiple channel signals, each such channel signal is typically assigned one or more unique time slots on the TDM bus 23.

The digital combiner 24 combines the n channel signals appearing at its inputs to produce a composite digital signal x(t) representing the n channels to be transmitted. In a sense, the function of the combiner 24 is the inverse of the channelizer 16. That is, the combiner 24 generates a composite synthesized signal consisting of the channel signals, evenly spaced apart in frequency.

The digital combiner 24 consists of an inverse FFT 242, and deconvolutional digital filter 241, which provide the composite digital signal x(t). Further details of the operation of the inverse FFT 242 and deconvolutional filter 241 are not necessary here, as they are discussed in detail in the co-pending patent application.

The composite signal x(t) is then processed by the out-of-band artifact signal generator 25, to identify one or more artifact signals, $a_x(t)$. These artifact signals are then added to the composite signal, x(t), by the adder 26, to provide an envelope-adjusted composite signal, h(t). The envelope-adjusted signal h(t) is forwarded to the D/A converter 27 and then to the frequency upconverter 28. The upconverter 28 translates the intermediate frequency composite signal to the desired radio frequency bandwidth. For example, in the IS-54 implementation being discussed, this frequency band is in the range of 800 to 900 MHz.

At this point the signal is fed to the high power amplifier 29, which provides a power amplified signal to the diplexed bandpass filters 30-1 and 30-2. The first bandpass filter 30-1 has a passband which passes only the in-band channel signals. The second bandpass filter 30-2 passes the out-of-band artifact signals to the impedance-matched artifact load 31. The diplexed transmit filters 30 thus pass the desired in-band transmit frequencies directly to the transmit antenna 32, while insuring that all out-of-band artifact signals are passed directly to the impedance-matched artifact load 31. As a result, the desired channel signals are passed through the power amplifier with the desired constant envelope characteristic, while the waveform transmitted by the antenna 32 does not have the constant waveform, but only the actually desired modulation since the out-of-band artifacts are split off before they reach the transmit antenna 32.

The out-of-band artifact signal generator 25 generates one or more out-of-band artifact signals, $a_x(t)$, which together have a net phase and amplitude to accurately offset the envelope variations of the in-band composite waveform x(t). To understand the operation of the artifact signal generator 25 in more detail, consider that the in-band composite signal, x(t), output by the combiner 24 is comprised of n narrowband signals, each of which can be represented by a complex sinusoid having an associated amplitude, $A_i$, and phase, $\phi_i$. The n individual baseband channel signals at the input to the combiner 25 can thus be expressed as:

Channel 1: $A_1 \cos [\phi_1(t)]$

Channel 2: $A_2 \cos [\phi_2(t)]$

Channel n: $A_n \cos [\phi_n(t)]$ and the composite waveform, x(t), as:

$$x(t) = \sum_{i=1}^{n} A_i \cos[\omega_i t + \phi_i(t)],$$

where $A_i$ and $\phi_i$ are the amplitude and phase, respectively, of the channel signal number i, and $\omega_i$ is the center frequency of the channel assigned to signal i.

Turning attention to FIG. 2A, there is shown a complex-plane representation of the individual signal phasors, $A_1, A_2, \ldots, A_n$. The circle 50 represents the unit circle. FIG. 2B illustrates a vector addition of the n carrier phasors, and FIG. 2C illustrates the resulting and composite signal x(t). This wideband composite signal x(t) does not exhibit a constant envelope over time. Instead, this signal has a uniformly random phase and a Rayleigh amplitude probability density.

FIGS. 2D, 2E, and 2F illustrate exemplary samples x(0), x(1), and x(2) of the composite signal x(t) taken at time 0, time 1 and time 2, respectively. As is evident from these figures, the composite signal x(t) exhibits amplitude modulation over time although the discrete signals which comprise the composite waveform may have no amplitude modulation individually.

An artifact phasor, a(t) is necessary to provide a vector sum to the composite transmit waveform x(t) such that the resultant signal h(t), that is, the signal to be applied to the high power amplifier 29, has a constant amplitude envelope. All of the components of the artifact phasor a(t) must be out-of-band in frequency and will vary considerably in amplitude. The artifact phasor a(t) must also advance in phase with each time sample to remain out-of-band in frequency while simultaneously placing the composite phasor sum to a constant value, as represented by the unit circle 50.

Such a situation is illustrated in FIG. 2D. The required artifact vector, a(0), is analogous to a complex-valued digital signal sample such that when added to the in-band composite signal sample, x(0), the result is a third complex-valued sample h(0), that has an amplitude equal to the amplitude of the unit circle 50.

Similarly, artifact vectors a(1) and a(2) are added to signal samples x(1) and x(2), to produce h(1) and h(2), also with amplitudes on the unit circle 50.

The net phase of the artifact vectors must also advance from sample to sample. As shown in FIG. 2D and subsequent-in-time FIGS. 2E and 2F, there is a differential phase component which must be added to subsequent artifact vectors a(1), a(2), . . . , to insure that the overall artifact signal a(t) exhibits the desired out-of-band frequency characteristic.

In other words, the frequency of the artifact signal a(t) must be controlled. Ideally, its frequency remains outside of the transmit frequency band, but inside of the Nyquist sampling bandwidth of the D/A converter 27 (FIG. 1).

At certain points in time, however, the artifact signal a(t) may itself be comprised of two or more out-of-band phasors whose net or sum is equal to the desired value of the artifact phasor a(t). For example, assume that the composite signal x(t) has a 5 MHz bandwidth consisting of signal energy ranging from 2.5 to 7.5 MHz (baseband), and that x(t) is sampled at a 20 MHz sampling rate. In that instance, the artifact phasor or phasors must be placed out-of-band, between DC and 2.5 MHz or between 7.5 and 10 MHz, to both avoid aliasing as well as interference with the in-band signals.

In practice, it is desirable for the out-of-band artifact signal a(t) to only include frequencies as close as possible to DC or 10 MHz, as such components will be easier to remove by the diplexed bandpass filters 30. In other words, the rolloff of the bandpass filters 30 (FIG. 1) need not be as sharp if the artifact frequencies are so selected.

The required phase calculation for each artifact vector is thus straightforward, since a fixed phase advance for each contiguous time sample results in a fixed artifact frequency product. For example, if it is desired to create an artifact phasor at a 9 MHz frequency, assuming that the sampling rate from the combiner 24 is the aforementioned 20 MHz, the artifact phasor must advance exactly $$\frac{9}{20} \times 360 \text{ degrees (°)},$$

or 162° for each sample. Similarly, a 1 MHz artifact phasor will advance 18° from sample to sample.

This phase calculation is thus done in advance, typically via a simple look-up table, once the desired frequencies of the out-of-band artifacts have been determined.

The artifact amplitude calculation is also straightforward. Given that an artifact phase is determined by knowing the sample index, then the artifact amplitude is determined by simple vector subtraction, as shown in FIG. 2D. The amplitude and phase of the composite signal at t=0 is already known—the advancing phase of the artifact phasor defines a direction of the artifact signal a(t). In the example illustrated in FIG. 2D, it will be assumed that the artifact phasor being constructed, $A_1(t)$, is a 1 MHz artifact phasor. Thus the unit circle 50 defines the desired amplitude of the vector sum of the composite x(0) and artifact a(0) phasors. Thus, with the only known being the amplitude of the artifact phasor a(0), it may be solved for by vector subtraction.

If the unit circle 50 is not in line with the direction of the artifact phasor $a_1(0)$, then a second artifact phasor, $a_2(t)$, at a different frequency is used, such as at 9 MHz, so that the net sum of the two artifact phasors $a_1(0)$ and $a_2(0)$ is on the unit circle 50. The net sum of the two artifact phasors $a_1(0)$ and $a_2(0)$ are then used as the sample, a(0) of the artifact signal.

Figure 3:
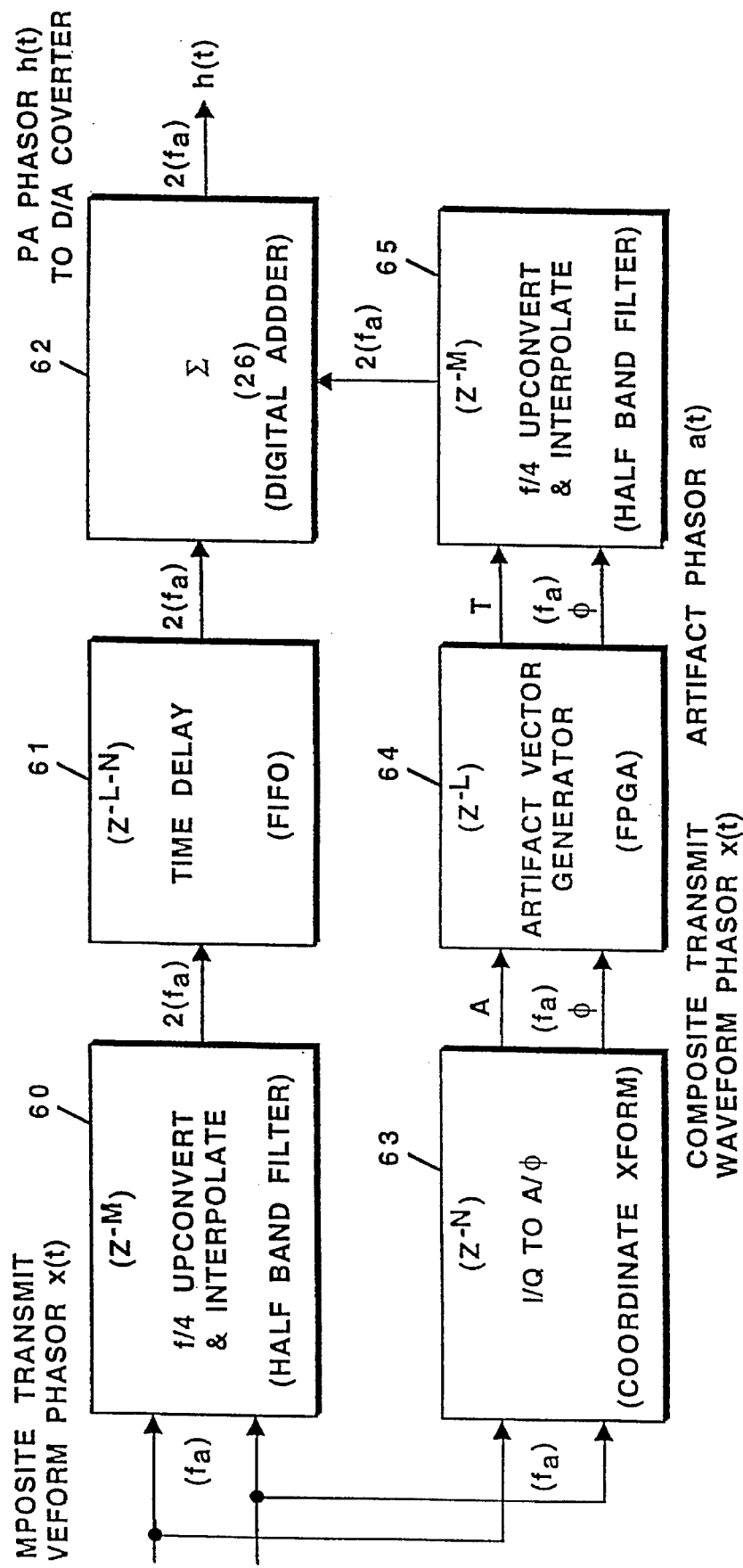
FIG. 3 is a detailed block diagram of one possible implementation of the artifact generator.

FIG. 3 illustrates one possible hardware implementation for the artifact signal generator 25, consisting of a half band filter 60, a time delay 61, a digital adder 62, a coordinate transform 63, an artifact vector generator 64, and a second half band filter 65.

In operation, the artifact generator 25 accepts the composite signal x(t) in the form of complex valued in-phase (I) and quadrature (Q) samples. The samples are fed along two paths as shown. In the upper path, the samples are first subjected to a complex-to-real value conversion, by a process of digital interpolation and upconversion by the halt-band filter 60, in a manner that is known in the art. The complex I and Q samples are thus transformed to a real-valued samples at twice the input rate.

The time delay unit 61 is then used to apply a compensating delay of (L–N) samples, to time-align the upper path samples with the lower path samples. The real-valued upper path samples are then summed with the lower path artifact samples using the digital adder 62 (adder 26 of FIG. 1). The resulting data is then applied to the D/A converter 27.

In the lower path, the complex valued samples are processed to determine the required artifact signal. First, a coordinate transform 63 changes the samples from I and Q form to amplitude and phase form. Following that conversion, the artifact generator 64 calculates the out-of-band artifact vector(s) as described above in connection with FIGS. 2D through 2F. This function may be implemented using a field programmable gate array or other programmable digital device. The complex artifact signal samples are then transformed to a real-valued signal using the second halfband filter 65.

Figure 4:
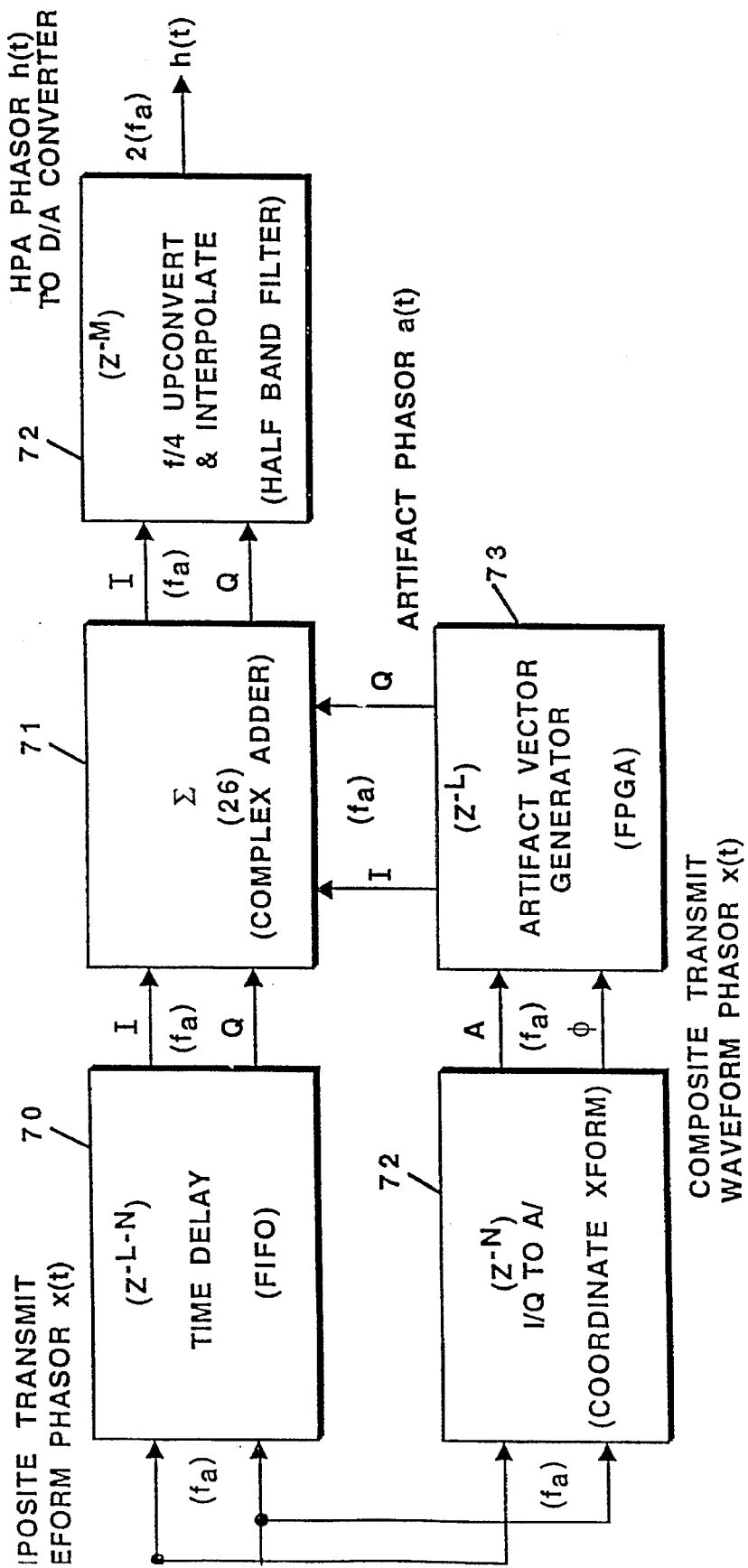
FIG. 4 is a detailed block diagram of another possible implementation of the artifact generator.

FIG. 4 shows a slightly different embodiment of the artifact signal generator 25 and adder 26. A time delay unit 70 performs the same function as the time delay unit 61 (FIG. 3); a coordinate transform 72 performs the same function as coordinate transform 63 (FIG. 3); and an artifact generator 73 performs the same function as the artifact generator 64 (FIG. 3). In this arrangement, the complex-valued I and Q samples of the composite signal x(t) are first summed with the complex artifact signals using a complex digital adder 71. The result of this addition then undergoes conversion to a real intermediate frequency using a halfband filter 74.

It can thus now be understood how a wideband waveform comprised of multiple narrowband signals which does not exhibit a constant envelope over time may be transmitted using a low cost, non-linear power amplifier 29. This is accomplished through the addition of one or more out-of-band artifact signals a(t) having the necessary net phase and amplitude characteristics to accurately offset the variations of the composite waveform x(t) to bring it to a relatively constant amplitude envelope signal, h(t). Any undesirable artifact frequencies falling out-of-band are removed through filter 30-2 at the output of the power amplifier. The in-band frequencies are passed to the transmit antenna 32 when the out-of-band frequencies are transmitted to the impedance-matched artifact load 31. As a result, any residual artifacts created by the envelope shaping technique pass through the power amplifier 29 and to the artifact dummy load 31.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A transmitter for processing signals in a multiple mobile subscriber unit wireless communication system comprising:

wideband digital combiner means, tier combining a plurality, n, of channel signals which are to be transmitted to a plurality of the mobile subscriber units, to produce a wideband composite digital signal, x(t), consisting of the n channel signals spaced apart in frequency, the wideband composite digital signal x(t) having an envelope that varies over time and a predetermined bandwidth;

artifact signal generating means, connected to receive the wideband composite digital signal, for generating an out-of-band artifact digital signal, a(t), which offsets the amplitude variations of the wideband composite digital signal, the artifact digital signal having frequency components that fall in a bandwidth outside of the predetermined bandwidth of the wideband composite digital signal;

summing means, connected to add the wideband composite digital signal x(t) and out-of-band artifact digital signal a(t), to produce a constant envelope digital signal, h(t);

digital-to-analog (D/A) conversion means, connected to receive the constant envelope digital signal, h(t), and to provide a constant envelope analog signal;

upconverter meters, connected to the D/A converter, for upconverting the constant envelope analog signal to a radio frequency (RF) to produce a constant envelope RF signal;

a high power amplifier, connected to receive the constant envelope RF signal, and to provide a power amplified RF signal;

RF filtering means, connected to receive the power amplified RF signal, for filtering components of the power amplified RF signal corresponding to the out-of-band artifact signal, to provide a wideband composite transmit signal; and an antenna, for receiving the wideband composite transmit signal from the filtering means, and for providing a wide band wireless composite signal to the plurality of mobile subscriber units.

2. A transmitter as in claim 1 additionally comprising:

a plurality of modulation means, connected to receive a plurality of subscriber signals which are to be transmitted to a plurality of mobile subscriber units, for providing the plurality, n, of channel signals to the wideband digital combiner means, each channel signal having a predetermined channel bandwidth.

3. A transmitter as in claim 2 additionally comprising:

time division multiplex means, disposed between the plurality of modulation means and the wideband digital combiner n-leans, for interconnecting any one of the channel signals to the wideband digital combiner means.

4. A transmitter as in claim 1 wherein the RF filtering means comprises:

a first bandpass filter placed in the signal path after the power amplifier, to pass only the desired in-band frequencies containing the channel signals directly to the antenna;

a second bandpass filter place in the signal path after the power amplifier, to pass the out-of-band artifact signals; and an impedance-matched artifact load, connected to the second bandpass filter, for receiving and terminating the out-of-band artifact signals.

5. A transmitter as in claim 1 wherein the artifact signal generating means comprises:

means for ascertaining the amplitude and phase of a series of samples of the wideband composite digital signal; and means for determining the amplitude and phase of a series of artifact samples that, when added to the series of samples of the wideband composite digital signal, produces a series of samples having a constant envelope.

6. A transmitter as in claim 5 wherein the means for determining the amplitude and phase of a series of artifact samples produces a series of artifact samples such that the phase difference between successive artifact samples is constant.

7. A transmitter as in claim 5 wherein the means for determining the amplitude and phase of a series of artifact samples produces a series of artifact samples in which each artifact sample comprises a plurality of phasors at different frequencies, all the artifact samples comprising the same number of phasors, the phase difference between respective phasors of successive artifact samples being constant, whereby the artifact digital signal has a constant center frequency.

* * * * *